(12) United States Patent
Kim et al.

(10) Patent No.: US 8,779,064 B2
(45) Date of Patent: Jul. 15, 2014

(54) POLYPROPYLENE RESIN COMPOSITION WITH GOOD TRANSPARENCE AND GOOD IMPACT STRENGTH

(75) Inventors: Yong-jeon Kim, Daejeon (KR); Jin-woo Lee, Daejeon (KR); Churl-young Park, Daejeon (KR); Nan-young Lee, Seoul (KR); Ro-my Lee, Daejeon (KR)

(73) Assignee: LG Chem, Ltd. (KR)

( * ) Notice: Subject to any disclaimer, the term of this patent is extended or adjusted under 35 U.S.C. 154(b) by 806 days.

(21) Appl. No.: 12/631,287

(22) Filed: Dec. 4, 2009

(65) Prior Publication Data

US 2010/0144975 A1    Jun. 10, 2010

(30) Foreign Application Priority Data

Dec. 5, 2008 (KR) .................. 10-2008-0123233

(51) Int. Cl.
*C08L 23/00* (2006.01)
*C08L 23/04* (2006.01)

(52) U.S. Cl.
USPC ................ 525/240; 525/191; 428/98

(58) Field of Classification Search
USPC .................................. 525/191, 240
See application file for complete search history.

(56) References Cited

U.S. PATENT DOCUMENTS

| | | | |
|---|---|---|---|
| 6,271,310 B1 * | 8/2001 | Okayama et al. | 525/191 |
| 2007/0117932 A1 * | 5/2007 | De Palo et al. | 525/240 |
| 2007/0122577 A1 * | 5/2007 | Iwasaki et al. | 428/35.7 |
| 2007/0203298 A1 * | 8/2007 | Massari et al. | 525/191 |
| 2009/0326123 A1 * | 12/2009 | Nakajima et al. | 524/394 |

FOREIGN PATENT DOCUMENTS

| | | | |
|---|---|---|---|
| JP | 2006316267 | * | 11/2006 |
| KP | 20010107427 | | 12/2001 |
| KR | 19900009832 | | 5/1990 |
| KR | 20010006497 | | 1/2001 |
| KR | 20040041727 A | | 5/2004 |
| KR | 20060116557 A | | 11/2006 |
| WO | WO2008081980 | * | 7/2008 |

* cited by examiner

*Primary Examiner* — Irina Krylova
(74) *Attorney, Agent, or Firm* — Lerner, David, Littenberg, Krumholz & Mentlik, LLP

(57) ABSTRACT

Provided is a polypropylene resin composition having excellent impact resistance, impact strength at low temperature and transparence comprising ethylene-alpha olefin copolymer (c) to a polypropylene resin composition in which the ratio of viscosity is regulated by adjusting molecular weight of propylene-alpha olefin random copolymer (a) and propylene-alpha olefin elastic copolymer (b), thereby regulating impact resistance and flexural modulus of the polypropylene resin composition and improving transparence; therefore, applying as various products including cold-storage containers for freezer and refrigerator, food packaging container, extrusion blow molding material, film, sheet and bottle cap, etc.

10 Claims, No Drawings

US 8,779,064 B2

POLYPROPYLENE RESIN COMPOSITION WITH GOOD TRANSPARENCE AND GOOD IMPACT STRENGTH

CROSS-REFERENCE TO RELATED APPLICATION

This application claims priority from Korean Patent Application No. 10-2008-0123233 filed on Dec. 5, 2008, in the Korean Intellectual Property Office, the disclosure of which is incorporated herein by reference in its entirety.

TECHNICAL FIELD

The present invention relates to a polypropylene resin composition having excellent impact resistance and transparence, more particularly a polypropylene resin composition comprising (a) propylene-alpha olefin random copolymer comprising ethylene or one or more C4-C10 alpha olefins of 0.5-10 mol % respective to the random copolymer; (b) propylene-alpha olefin elastic copolymer comprising ethylene or one or more C4-C10 alpha olefins of 20-70 weight %; and (c) ethylene-alpha olefin copolymer comprising one or more C4-C10 alpha olefins of 1-50 weight %.

BACKGROUND OF THE INVENTION

Polypropylene resin is a kind of general resin, which is easy to process and has excellent properties for the cost, so that it has wide spectrum of use, precisely it takes the place of conventional materials such as glass, wood, paper, metal, etc, and also can be applied to the field of other plastic products even including engineering plastic. However, homopolypropylene resin has low impact strength even though it has high strength, and thus it is limited in use. To improve impact strength of such polypropylene, propylene-ethylene block copolymer is prepared by melt intercalating or adding ethylene-propylene copolymer or EPDM (ethylene propylene diene copolymer) to homopolypropylene in a reactor. Propylene-ethylene block copolymer has excellent impact strength, so that it can be widely applied in injection molded products such as automobile parts, house appliances, parts for industrial fields, general goods, and packaging containers, packaging films and sheets. However, the molded product produced from propylene-ethylene block copolymer has very poor transparence even though it has high impact resistance, so that it is limited in use for molded articles for food packaging, blow molding materials, films, sheets, etc. So, random copolymer produced by simultaneous polymerization of propylene and a small amount of comonomer (mainly ethylene or butene) in the same reactor is used. Random copolymer has low working temperature, for example low heat-sealing temperature, and high transparence. Therefore, it can be used for such products requiring high transparence as food packaging containers, films, sheets, and blow molding materials, etc, but because of its low impact resistance, which is as low as that of homopolypropylene, it is difficult to be used at low temperature, for example for freezer or refrigerator containers, etc.

To have advantages of both propylene-ethylene block copolymer and random copolymer, which are excellent impact resistance and excellent transparence, Korean Patent No. 156560 describes a method for regulating the ratio of intrinsic viscosity of ethylene-propylene random copolymer and elastic ethylene-propylene copolymer. The composition obtained by this method, however, did not show any improvement in transparence and still had low impact strength at low temperature.

Korean Patent No. 10-0500497 describes a method for regulating the ratio of intrinsic viscosity and melt index of olefin copolymer and monopolymer and ethylene-propylene copolymer. However, the resin composition obtained by this method did not show satisfactory improvement in transparence, so that it is not proper to be used for thick products including injection products.

Korean Patent No. 10-0361550 describes a method for preparing a resin composition for extrusion blow molding, in which ethylene-propylene random copolymer is melt-mixed with ethylene-alpha olefin copolymer elastomer prepared by using a metallocene catalyst. According to this method, it is difficult to distribute the elastomer on the ethylene-propylene random copolymer, resulting in the product with unsatisfactory transparence and low impact strength at low temperature.

Korean Patent No. 10-0484603 describes a resin composition composed of ethylene-propylene random copolymer and elastic ethylene-propylene copolymer with providing intrinsic viscosity value of the ethylene-propylene elastic copolymer. But, if absolute viscosity of ethylene-propylene random copolymer is lower than that of elastic ethylene-propylene copolymer, transparence is decreased. Thus, this method is limited in preparing a composition having high transparence and high impact resistance.

Korean Patent Publication No. 2006-0116557 describes a resin composition comprising ethylene-propylene random copolymer composed of ethylene-propylene or propylene-butene-1 random copolymer and elastic ethylene-propylene copolymer, and a method for increasing transparence and impact resistance by regulating the ratio of ethylene/propylene in ethylene-propylene elastic copolymer and the ratio of melt index of ethylene-propylene elastic copolymer. However, the composition prepared by this method still has low impact strength at low temperature.

SUMMARY OF THE INVENTION

An aspect of the present invention is directed to providing a propylene resin composition having excellent transparence and impact resistance, to overcome the above problems.

In accordance with another aspect of the present invention, a polypropylene resin composition comprises:

(a) 50-94 weight % of propylene-alpha olefin random copolymer comprising ethylene or one or more C4-C10 alpha olefins of 0.5-10 mol % by the weight of random copolymer;

(b) 5-49 weight % of propylene-alpha olefin elastic copolymer comprising ethylene or one or more C4-C10 alpha olefins of 20-70 weight %; and (c) 1-45 weight % of ethylene-alpha olefin copolymer comprising one or more C4-C10 alpha olefins of 1-50 weight %, based on weight of all components of the polypropylene resin composition.

Hereinafter, the present invention is described in detail.

The present invention relates to a polypropylene resin composition having excellent impact resistance, impact strength at low temperature and transparence prepared by adding (c) ethylene-alpha olefin copolymer to a polypropylene resin composition in which the ratio of viscosity is regulated by adjusting molecular weight of (a) propylene-alpha olefin random copolymer and (b) propylene-alpha olefin elastic copolymer.

The present invention relates to a polypropylene resin composition comprising (a) 50-94 weight % of propylene-alpha olefin random copolymer comprising ethylene or one or more C4-C10 alpha olefins of 0.5-10 mol % by the weight of random copolymer; (b) 5-49 weight % of propylene-alpha olefin elastic copolymer comprising ethylene or one or more C4-C10 alpha olefins of 20-70 weight %; and (c) 1-45 weight % of ethylene-alpha olefin copolymer comprising one or more C4-C10 alpha olefins of 1-50 weight %, based on weight of all components of the polypropylene resin composition.

The present invention relates to a polypropylene resin composition comprising (a) 50-94 weight % propylene-alpha olefin random copolymer comprising ethylene or one or more C4-C10 alpha olefins of 0.5-10 mol % respective to the random copolymer; (b) 5-49 weight % propylene-alpha olefin elastic copolymer comprising ethylene or one or more C4-C10 alpha olefins of 20-70 weight %; and (c) 1-45 weight % ethylene-alpha olefin copolymer comprising one or more C3-C10 alpha olefins of 1-50 weight %, wherein a ratio of intrinsic viscosity of soluble (XS) of the elastic copolymer (b) in xylene to that of the random copolymer (a) (IV-b/IV-a) is 0.3-1, and the alpha olefin in the copolymer (c) is one or more compounds selected from the group consisting of propylene, 1-butene, 1-pentene, 1-hexene, 1-octene, 1-decene, 4-methyl-1-pentene and 3-methyl-1-pentene. It is preferred that the ratio of intrinsic viscosity of soluble (XS) of the elastic copolymer (b) in xylene to that of the random copolymer (a) (IV-b/IV-a) is 0.3-1.

It is preferred that the ratio of melt index of (c) copolymer to that of the random copolymer (a) (MI-c/MI-a) is 0.4-3.

It is preferred that the ratio of melt index of the resin composition to that of the random copolymer (a) (MI-p/MI-a) is 0.8-1.5. In another preferred embodiment, the ratio of melt index of the resin composition to that of the random copolymer (a) (MI-p/MI-a) is 0.9-1.2.

Preparation of Propylene-Alpha Olefin Random Copolymer (a)

A propylene-alpha olefin random copolymer (a) used in this invention can be prepared as follows:

To a reactor were added propylene, ethylene or one or more C4-C10 alpha olefins, triethylaluminium, Ziegler-Natta catalyst, silane based electron donor and hydrogen (molecular weight regulator), followed by polymerization at 50-100° C. under the pressure of 5-50 bar for approximately 30 minutes to 3 hours to give the propylene-alpha olefin random copolymer (a).

The high crystalline propylene-alpha olefin random copolymer (a) of the present invention makes the product maintain mechanical strength and at the same time endows proper heat-resistance and has compatibility with the components (b) and (c) to maintain transparence and improve impact strength.

The high crystalline propylene-alpha olefin random copolymer (a) contains alpha olefin preferably of 0.5-10 mol % by the weight of random copolymer. If the content is less than 0.5 mol %, crystallinity of the copolymer is increased, indicating that strength of the product is high but transparence is reduced. On the other hand, if the content is more than 10 mol %, crystallinity is reduced, indicating that transparence of the product is satisfactory but strength is reduced and heat-resistance is decreased as well, resulting in the limitation in use. Therefore, the content of alpha olefin has to be properly regulated to control strength and transparence to fit the purpose of use.

The alpha olefin used in this invention is preferably C2-C10 alpha olefin, exemplified by ethylene, 1-butene, 1-pentene, 1-hexene, 1-octene, 1-decene, 4-methyl-1-pentene, and 3-methyl-1-pentene. The alpha olefin herein can be used alone or along with two or more compounds for copolymerization with propylene.

The copolymer (a) can be prepared by continuous, semi-continuous or batch type slurry, bulk or gas phase polymerization.

The catalyst used for the production of the random copolymer (a) can be metallocene catalyst or Ziegler-Natta catalyst, but not always limited thereto. However, it might be more advantageous for obtaining high flexural modulus to use high crystalline Ziegler-Natta catalyst favoring the production of high stereo-specific polypropylene.

Melt index of the propylene-alpha olefin random copolymer (a) is 0.5-100 g/10 min, preferably 0.5-50 g/min, and melting point is 130-160° C.

Preparation of Propylene-Alpha Olefin Elastic Copolymer (b)

A propylene-alpha olefin elastic copolymer (b) used in the present invention favors increasing compatibility and dispersity between two phases by regulating composition and molecular weight of the propylene-alpha olefin elastic copolymer (b) based on the regulation of composition and molecular weight of the propylene-alpha olefin random copolymer (a), resulting in the improvement of impact resistance and transparence of polypropylene resin composition.

The propylene-alpha olefin elastic copolymer (b) can be prepared as follows:

After producing the random copolymer (a), propylene, alpha olefin and hydrogen (molecular weight regulator) were added to a reactor, followed by polymerization at 50-100° C. under the pressure of 5-50 bars for approximately 30 minutes to 3 hours to give an elastic copolymer (b).

The elastic copolymer (b) contains alpha olefin preferably of 20-70 weight %. If the content is less than 20 weight %, compatibility with the random copolymer (a) is high and thus transparence is excellent, but strength and impact strength particularly impact strength at low temperature are reduced. On the other hand, if the content is more than 70 weight %, impact strength is reduced.

The alpha olefin used in this invention is preferably C4-C10 alpha olefin, exemplified by ethylene, 1-butene, 1-pentene, 1-hexene, 1-octene, 1-decene, 4-methyl-1-pentene, and 3-methyl-1-pentene. The alpha olefin herein can be used alone or along with two or more compounds for copolymerization with propylene.

The elastic copolymer (b) can be prepared by type slurry, bulk or gas phase polymerization and gas phase polymerization is generally used.

The propylene-alpha olefin elastic copolymer (b) preferably has melt index of 0.5-150 g/10 min in order for the ratio of intrinsic viscosity of solubles (XS) of the elastic copolymer (b) in xylene to that of the random copolymer (a) (IV-b/IV-a) to be 0.3-1. If the melt index falls within that range, transparence and impact resistance are improved.

Preparation of Ethylene-Alpha Olefin Copolymer (c)

The ethylene-alpha olefin copolymer (c) used in this invention can be prepared as follows:

To a reactor were added ethylene, alpha olefins, Ziegler-Natta or metallocene catalyst, triethylaluminum or MAO and hydrogen (molecular weight regulator), followed by polymerization at 50-200° C. under the pressure of 5-50 bar for approximately 30 minutes to 3 hours to give an ethylene-alpha olefin copolymer (c).

The ethylene-alpha olefin copolymer (c) has melt index of 0.5-50 g/min (190° C.) so as to make the ratio of melt index of the copolymer (c) to that of the random copolymer (a) (MI-c/MI-a) to be 0.4-3, and has density of 0.870-0.955 g/cm$^3$. In that case, transparence and impact strength can be improved.

The ethylene-alpha olefin copolymer (c) contains alpha olefin preferably of 1-50 weight %. If the alpha olefin content is out of that range, transparence and impact resistance are reduced.

The alpha olefin used in this invention is preferably C4-C10 alpha olefin, exemplified by ethylene, 1-butene, 1-pentene, 1-hexene, 1-octene, 1-decene, 4-methyl-1-pentene, and 3-methyl-1-pentene. The alpha olefin herein can be used alone or along with two or more compounds for copolymerization with propylene.

The copolymer (c) can be prepared by continuous, semi-continuous or batch type slurry, bulk or gas phase polymerization. This copolymer is exemplified by high density polyethylene (HDPE) copolymer, medium density polyethylene (MDPE) copolymer, linear low density polyethylene (LLDPE) copolymer, very low density polyethylene (VLDPE) copolymer, plastomer, and elastomer, etc.

The preferable content of each copolymer in the composition of the present invention is as follows: (a) propylene-alpha olefin random copolymer, 50-94 weight %; (b) propylene-alpha olefin elastic copolymer, 5-49 weight %, and (c) ethylene-alpha olefin copolymer, 1-45 weight %.

According to the present invention, a polypropylene composition not only having excellent transparence but also having regulated impact resistance and flexural modulus can be prepared by controlling the contents of component (a), component (b) and component (c), the ratio of intrinsic viscosity of component (a) to component (b), and the ratio of melt index of component (a) to component (c).

At this time, the ratio of intrinsic viscosity (IV-b/IV-a) of solubles (XS) of the elastic copolymer (b) in xylene (IV-b) to that of the random copolymer (a) (IV-a) is preferably 0.3-1, and more preferably 0.5-0.9. The ratio of melt index (MI-c/MI-a) of (c) copolymer (MI-c) to that of the random copolymer (a) (MI-a) is preferably 0.4-3, and more preferably 0.5-2.

If those ratios are out of the said ranges, impact resistance and transparence cannot be satisfactorily improved.

The polypropylene resin composition prepared according to the present invention can be used for cold-storage containers for freezer and refrigerator, food packaging containers, extrusion blow molding materials, films, sheets and bottle caps by injection molding, extrusion molding or blow molding.

The resin composition of the present invention can additionally include such additives as antioxidants, neutralizers, dispersing agents, weather proofers, antistatic agents, UV stabilizers, slip agents, antiblocking agents, talc, and nucleating agents as long as these additives do not reduce the properties of the resin. In particular, the nucleating agent used to supplement mechanical strength and transparence of the resin composition is a compound or a mixture of those selected from the group consisting of dibenzylidene sorbitol, di(p-methylbenzylidene)sorbitol, dimethyl benzylidene sorbitol, alkylbenzoic acid aluminum salt, and organic phosphometal salt. And the preferable content of the nucleating agent is 500 ppm-3,000 ppm.

The advantages, features and aspects of the invention will become apparent from the following description of the embodiments with reference to the accompanying drawings, which is set forth hereinafter.

EXAMPLES

Example 1

Step 1: Preparation of Propylene-Alpha Olefin Random Copolymer (a)

To a reactor were added ethylene, propylene, hydrogen, triethylaluminium (cocatalyst) and dicyclopentyldimethox (silane based electron donor), followed by slurry bulk polymerization at 70° C. under the pressure of 38 bar to give the (a) propylene-ethylene random copolymer having the melt index of 2.5 g/10 min and ethylene content of 2.5 weight %.

Step 2: Preparation of Propylene-Alpha Olefin Elastic Copolymer (b)

The propylene-ethylene random copolymer (a) obtained from the polymerization of step 1 was transferred to a gas phase reactor, to which ethylene, propylene and hydrogen were loaded to adjust ethylene/ethylene+propylene) molar ratio to be 0.35 and hydrogen/ethylene molar ratio to be 0.5, followed by continuous gas phase polymerization at 75° C. under the pressure of 10-15 bar to give the propylene-ethylene elastic copolymer (b) comprising ethylene of 46 weight %.

The polypropylene resin produced from the steps 1 and 2 was composed of propylene-ethylene random copolymer (85 weight %) and propylene-ethylene elastic copolymer (15 weight %) and has the melt index of 2.4 g/10 min and ethylene content of 9.1 weight %.

Step 3: Preparation of Ethylene-Alpha Olefin Copolymer and Resin Composition (c)

6 weight % of ethylene-octene copolymer elastomer (LG Chemical Co., LC670: melt index 5 g/10 min (190° C.), density: 0.870 g/cm$^3$) prepared by using metallocene catalyst was added to 94 weight % of the polypropylene resin composition prepared through the above steps 1 and 2. Then, antioxidant, neutralizer and nucleating agent were added thereto, followed by the preparation of pellet using twin screw extruder. ASTM standard injection samples were prepared using injection molding device, followed by the measurement of physical properties thereof. The results are shown in Table 1.

Example 2

A polypropylene resin composition was prepared by the same manner as described in Example 1 except that ethylene-octene copolymer (LG Chemical Co., LT800: melt index 2.2 g/10 min (190° C.), density: 0.898 g/cm$^3$) prepared by using metallocene catalyst was used instead of ethylene-octene copolymer elastomer for the ethylene-alpha olefin copolymer (c).

Example 3

A polypropylene resin composition was prepared by the same manner as described in Example 1 except that ethylene-butene copolymer (LG Chemical Co., LC575: melt index 3.8 g/10 min (190° C.), density: 0.898 g/cm$^3$) prepared by using metallocene catalyst was used instead of ethylene-octene copolymer elastomer for the ethylene-alpha olefin copolymer (c).

Example 4

A polypropylene resin composition was prepared by the same manner as described in Example 1 except that ethylene-butene copolymer elastomer (LG Chemical Co., LC575A: melt index 5 g/10 min (190° C.), density: 0.875 g/cm$^3$) prepared by using metallocene catalyst was used instead of ethylene-octene copolymer elastomer for the ethylene-alpha olefin copolymer (c).

Example 5

A polypropylene resin composition was prepared by the same manner as described in Example 1 except that low density polyethylene (LLDPE, LG Chemical Co., ST508: melt index 4.4 g/10 min (190° C.), density: 0.914 g/cm$^3$) prepared by using Ziegler-Natta catalyst was used instead of ethylene-octene copolymer elastomer for the ethylene-alpha olefin copolymer (c).

Comparative Example 1

A polypropylene resin composition was prepared by mixing antioxidant, neutralizer and nucleating agent with the polypropylene resin composition prepared in steps 1 and 2 of Example 1

Comparative Example 2

The (a) propylene-ethylene random copolymer having the melt index of 13 g/10 min and ethylene content of 3.5 weight % was prepared by adjusting the concentrations of ethylene and hydrogen supplied to the reactor of step 1, Example 1. Then, a polypropylene resin composition was prepared by mixing antioxidant, neutralizer and nucleating agent with the copolymer.

Comparative Example 3

The propylene-ethylene random copolymer (a) prepared in Comparative Example 2 was transferred to a gas phase reactor to give the propylene-ethylene elastic copolymer (b) comprising ethylene of 45 weight %. Then, a polypropylene resin composition comprising 84 weight % of propylene-ethylene random copolymer (a) and 16 weight % of propylene-ethylene elastic copolymer (b) and having the melt index of 8.7 g/10 min and ethylene content of 10.1 weight % was prepared by mixing antioxidant, neutralizer and nucleating agent with the copolymer.

Comparative Example 4

The propylene-ethylene random copolymer (a) prepared in Comparative Example 2 was transferred to a gas phase reactor to give the propylene-ethylene elastic copolymer (b) comprising ethylene of 45 weight %. Then, a polypropylene resin composition comprising 86 weight % of propylene-ethylene random copolymer (a) and 14 weight % of propylene-ethylene elastic copolymer (b) and having the melt index of 14.4 g/10 min and ethylene content of 9.2 weight % was prepared by mixing antioxidant, neutralizer and nucleating agent with the copolymer.

Physical properties of the polypropylene compositions prepared in Examples and Comparative Examples of the present invention were measured as follows.

1) Melt Index

According to ASTM D1238, melt indexes of ethylene alpha olefin copolymer (c), propylene-alpha olefin random copolymer (a) and the resin composition of the present invention were measured with 2.16 kg weight respectively at 190° C. and 230° C. Melt index was presented by weight (g) of polymer melted out for 10 minutes.

The value measured at 190° C. was presented as g/10 min (190° C.) and the value measured at 230° C. was presented as g/10 min.

2) Ethylene Content

In the case that the alpha olefin used for (a) and (b) is ethylene, the ethylene contents in propylene-ethylene random copolymer (a), propylene-ethylene elastic copolymer (b), ethylene-alpha olefin copolymer (c), and the polypropylene resin composition prepared in this invention were calculated by measuring the height of 4800-3500 cm$^{-1}$ peak reflecting the sample thickness and the area of 790-660 cm$^{-1}$ peak indicating ethylene at IR absorption spectrum using FT-IR (Bio-Rad FTS 3000). Formula was obtained by using the ethylene content of a standard material, known already, the area of 790-660 cm$^{-1}$ peak and the height of 4800-3500 cm$^{-1}$ peak (ethylene content=area of 790-660 cm$^{-1}$ peak/height of 4800-3500 cm$^{-1}$ peak. By this formula, the content of ethylene in copolymer was calculated.

3) Xylene Solubles (XS)

2 g of polypropylene resin was added in a round flask together with 200 ml of xylene and dissolved at 135° C. for 1 hour, followed by cooling down to 25° C. for re-crystallization. The part dissolved in xylene was extracted and xylene was evaporated. The remaining sample was measured by %.

4) Absolute Viscosity

Intrinsic viscosity was measured at 135° C. in decalin solvent.

5) Transparence

To the resin composition were added calcium stearate 1000 ppm, phenol based antioxidant 1000 ppm, phosphate based antioxidant 1000 ppm, antistatic agent 600 ppm and sorbitol based nucleating agent 2000 ppm, followed by extrusion. Samples in 1 mm and 2 mm in thickness were prepared by using hydraulic injection molding device, which were tested for transparence by ASTM D 1003.

6) Izod Impact Strength and Flexural Modulus

The said additives were added to the resin composition, followed by extrusion. Samples in 3 mm thickness were prepared by using hydraulic injection molding device. Izod impact strength was measured by ASTM D256. Samples in 6 mm thickness were prepared and then flexural modulus was measured by ASTM D790.

TABLE 1

| | Property | Unit | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|---|
| Component (a) | Content | Weight % | 79.9 | 79.9 | 79.9 | 79.9 | 79.9 | 85 | 100 | 84 | 86 |
| | Melt index | g/10 min (230° C.) | 2.5 | 2.5 | 2.5 | 2.5 | 2.5 | 2.5 | 13 | 13 | 13 |
| | Ethylene Content | Weight % | 2.5 | 2.5 | 2.5 | 2.5 | 2.5 | 2.5 | 3.5 | 3.5 | 3.5 |
| | Xylene solubles | Weight % | 4.5 | 4.5 | 4.5 | 4.5 | 4.5 | 4.5 | 6.1 | 6.1 | 6.1 |

TABLE 1-continued

|  | Property | Unit | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|---|
|  | (XS) Content |  |  |  |  |  |  |  |  |  |  |
|  | Intrinsic viscosity | dl/g | 2.3 | 2.3 | 2.3 | 2.3 | 2.3 | 2.3 | 1.6 | 1.6 | 1.6 |
| Component (b) | Content | Weight % | 14.1 | 14.1 | 14.1 | 14.1 | 14.1 | 15 | — | 16 | 14 |
|  | Ethylene Content | Weight % | 46 | 46 | 46 | 46 | 46 | 46 | — | 45 | 45 |
|  | Intrinsic viscosity | dl/g | 1.3 | 1.3 | 1.3 | 1.3 | 1.3 | 1.3 | — | 2.2 | 1.0 |
| Component (c) | Content | Weight % | 6 | 6 | 6 | 6 | 6 | — | — | — | — |
|  | Melt index (190° C.) | g/10 min | 5 | 2.2 | 3.8 | 5 | 4.4 | — | — | — | — |
|  | Density | g/cm$^3$ | 0.87 | 0.898 | 0.901 | 0.875 | 0.914 | — | — | — | — |
| Physical property | Melt index | g/10 min | 2.6 | 2.5 | 2.4 | 2.6 | 2.4 | 2.4 | 13 | 8.7 | 14.4 |
|  | Ethylene Content | Weight % | 13.1 | 13.9 | 12.4 | 12.3 | 14.9 | 9.1 | 3.5 | 10.1 | 9.2 |
|  | Xylene solubles (XS) Content | Weight % | 23.0 | 22.1 | 22.1 | 24.1 | 17.6 | 19.0 | 6.1 | 19.1 | 17.1 |
|  | Xylene solubles (XS) intrinsic viscosity | dl/g | 1.01 | 1.00 | 1.03 | 0.99 | 1.00 | 1.06 | 0.2 | 1.6 | 0.70 |
|  | Haze (1 mm) | % | 31 | 28 | 26 | 31 | 19 | 24 | 7 | 83 | 31 |
|  | Flexural modulus | Kg/cm$^2$ | 9500 | 9300 | 9600 | 9300 | 10000 | 10300 | 12700 | 9800 | 10100 |
|  | IZOD (23° C.) | Kgcm/cm | 56.6 | 57.7 | 58.4 | 57.5 | 57.9 | 51.5 | 5.1 | 8.8 | 36.3 |
|  | IZOD (−20° C.) | Kgcm/cm | 2.8 | 3.0 | 2.9 | 3.0 | 2.7 | 1.9 | 1.7 | 3.2 | 2.0 |
| Viscosity ratio (IV-b/IV-a) | | — | 0.6 | 0.6 | 0.6 | 0.6 | 0.6 | 0.6 | — | 1.4 | 0.6 |
| Melt index ratio (MI-c/MI-a) | | [g/10 min (190° C.)]/ g/10 min | 2 | 0.88 | 1.52 | 2 | 1.76 | — | — | — | — |
| Melt index ratio (MI-p/MI-a) | | — | 1.04 | 1.00 | 0.96 | 1.04 | 0.96 | 0.96 | 1.00 | 0.67 | 1.11 |

As shown in Table 1, the composition of Comparative Example 4 was compared with that of Comparative Example 3 whose intrinsic viscosity ratio (IV-b/IV-a) of (b) xylene soluble rubber to that of (a) was bigger than 1. As a result, it demonstrated excellent transparence and impact resistance at room temperature but impact strength at low temperature was not so much improved.

The compositions of Examples of the present invention comprising (c) and showing the ratio of intrinsic viscosity (IV-b/IV-a) of (b) xylene solubles (XS) to that of (a) of 0.6, less than 1, and the ratio of melt index (MI-c/MI-a) of (c) to that of (a) of at least 4.0 were compared with the composition of Comparative Example 1 which did not contain (c). The compositions of Examples had improved transparence, impact resistance at room temperature and impact strength at low temperature as well.

As explained hereinbefore, the polypropylene resin composition of the present invention has excellent impact resistance, impact strength at low temperature, flexural modulus and transparence, so that it can be widely used for various products including films, sheets, extrusion blow molding containers, food packaging containers, containers for freezer and refrigerator, etc.

While the present invention has been described with respect to the specific embodiments, it will be apparent to those skilled in the art that various changes and modifications may be made without departing from the spirit and scope of the invention as defined in the following claims.

What is claimed is:

1. A polypropylene resin composition comprising:
   (a) 50-94 weight % propylene-alpha olefin random copolymer comprising ethylene or one or more C4-C10 alpha olefins of 0.5-10 mol % respective Go the random copolymer;
   (b) 5-49 weight % propylene-alpha olefin elastic copolymer comprising ethylene or one or more C4-C10 alpha olefins of 20-70 weights respective to the elastic copolymer; and
   (c) 1-45 weight % ethylene-alpha olefin copolymer comprising one or more C3-C10 alpha olefins of 1-50 weight % respective to the olefin copolymer,
   wherein a ratio of intrinsic viscosity of solubles of the elastic copolymer (b) in xylene to that of the random copolymer (a) is 0.3-0.6,
   wherein a ratio of melt index or the ethylene-alpha olefin copolymer (c) to that of the propylene-alpha olefin random copolymer (a) is 0.5-2,
   wherein a ratio of a melt index of the resin composition to that of the propylene-alpha olefin random copolymer (a) is 0.9-1.2, and
   wherein the composition has a haze of 19-31%, a flexural modulus of 9300-10000 Kg/cm$^2$, an IZOD impact strength measured at 23° C. of 56.6-58.4 Kgcm/cm, and an IZOD impact strength measured at −20° C. of 2.7-3.0 Kgcm/cm.

2. The polypropylene resin composition according to claim 1, wherein the propylene-alpha olefin random copolymer (a) has a melt index of 0.5-100 g/10 min when measured with 2.16 kg weight at 230° C.

3. The polypropylene resin composition according to claim 1, wherein the propylene-alpha olefin random copolymer (a) has a melting point of 130-160° C.

4. The polypropylene resin composition according to claim 1, wherein the elastic-alpha copolymer (b) has a melt index of 0.5-150 g/10 min when measured with 2.16 kg weight at 230° C.

5. The polypropylene resin composition according to claim 1, wherein the alpha olefin in the propylene-alpha olefin random copolymer (a) and the elastic-alpha copolymer (b) is one or more compounds selected from the group consisting of ethylene, 1-butene, 1-pentene, 1-hexene, 1-octene, 1-decene, 4-methyl-1-pentene and 3-methyl-1-pentene.

6. The polypropylene resin composition according to claim 1, wherein the alpha olefin in the copolymer (c) is one or more compounds selected from the group consisting of propylene, 1-butene, 1-pentene, 1-hexene, 1-octene, 1-decene, 4-methyl-1-pentene and 3-methyl-1-pentene.

7. The polypropylene resin composition according to claim 1, wherein the ethylene-alpha olefin copolymer (c) has a melt index of 0.5-50 g/min when measured with 2.16 kg weight at 190° C.

8. The polypropylene resin composition according to claim 1, wherein the ethylene-alpha olefin copolymer (c) has and a density of 0.870-0.955 g/cm$^3$.

9. A product comprising the polypropylene resin composition of claim 1.

10. The product according to claim 9, wherein the product is selected from the group consisting of a film, Sheet, extrusion blow molding container, food packaging container, and container for freezer or refrigerator.

\* \* \* \* \*